US006133543A

United States Patent [19]

Borowy et al.

[11] Patent Number: 6,133,543

[45] Date of Patent: Oct. 17, 2000

[54] SYSTEM AND METHOD FOR DUAL THRESHOLD SENSING IN A PLASMA ARC TORCH

[75] Inventors: Dennis M. Borowy, Hanover; Jon W. Lindsay, West Lebanon; Tianting Ren, Lebanon, all of N.H.

[73] Assignee: Hypertherm, Inc., Hanover, N.H.

[21] Appl. No.: 09/187,274

[22] Filed: Nov. 6, 1998

[51] Int. Cl.[7] ........................ B23K 9/00

[52] U.S. Cl. ........................ 219/121.57; 219/121.62

[58] Field of Search ........................ 219/121.57, 121.62, 219/125.1, 130.01, 130.1, 121.44, 130.4; 315/111.21, 111.31, 111.41, 111.51; 118/723 I; 373/25

[56] References Cited

U.S. PATENT DOCUMENTS

| | | | |
|---|---|---|---|
| 3,725,637 | 4/1973 | Wenrich et al. | 219/136 |
| 4,020,294 | 4/1977 | Kitajewski et al. | 179/18 FA |
| 4,225,769 | 9/1980 | Wilkins | 219/130.4 |
| 4,324,971 | 4/1982 | Frappier | 219/121.56 |
| 4,598,191 | 7/1986 | Marhic et al. | 219/121.57 |
| 4,996,407 | 2/1991 | Traxler | 219/121.54 |
| 5,296,665 | 3/1994 | Peterson et al. | 219/121.57 |
| 5,349,605 | 9/1994 | Campbell | 373/25 |
| 5,416,297 | 5/1995 | Luo et al. | 219/121.57 |
| 5,416,407 | 5/1995 | Drafts | 324/117 H |
| 5,450,000 | 9/1995 | Olsen | 323/222 |
| 5,461,308 | 10/1995 | Jin et al. | 324/117 R |
| 5,506,384 | 4/1996 | Yamaguchi | 219/121.57 |
| 5,530,220 | 6/1996 | Tatham | 219/121.57 |
| 5,548,097 | 8/1996 | Couch, Jr. et al. | 219/121.57 |
| 5,620,617 | 4/1997 | Borowy et al. | 219/121.54 |
| 5,990,443 | 11/1999 | Tatham et al. | 219/121.57 |

*Primary Examiner*—Teresa Walberg
*Assistant Examiner*—Quang Van
*Attorney, Agent, or Firm*—Testa, Hurwitz & Thibeault, LLP

[57] ABSTRACT

A system for controlling a plasma arc torch circuit uses two different current thresholds to control pilot current, thereby reducing nozzle wear while maintaining a reliable arc and an adequate transfer height. Specifically, by using a Hall effect current sensor to monitor low levels of current in the lead that normally carries high current, it is possible to determine more accurately (1) when there is a low level of pilot arc current that can be ramped to a higher level, and (2) when the level of transferred current is capable of reliably sustaining a transferred arc such that the pilot arc can be extinguished. Thus, the current can be removed from the nozzle, at the precise moment in time that the torch can reliably sustain the transferred arc, thereby saving wear on the nozzle. In addition, the system of the present invention can save nozzle wear when used in combination with circuits that compensate for discontinuities in the workpiece by decreasing the current to the workpiece to a pilot arc level. Applicants have found the invention to be particularly advantageous when employed in a hand-held plasma arc torch system.

15 Claims, 7 Drawing Sheets

BASIC METHOD

SYSTEM AND METHOD FOR DUAL THRESHOLD SENSING IN A PLASMA ARC TORCH

FIELD OF THE INVENTION

The invention relates generally to the field of plasma arc torch systems and cutting processes. In particular, the invention relates to circuitry and methods for maintaining a plasma arc during operation of the torch while reducing wear on the nozzle.

BACKGROUND OF THE INVENTION

Plasma arc torches are used widely in the processing (e.g., cutting and marking) of metallic materials. A plasma arc torch generally includes a torch body, an electrode mounted within the body, a nozzle with a central exit orifice, electrical connections, passages for cooling and arc control fluids, a swirl ring to control the fluid flow patterns, and a power supply. The torch produces a plasma arc, which is a constricted ionized jet of a plasma gas with high temperature and high momentum. The plasma gas can be non-reactive, e.g. nitrogen or argon, or reactive, e.g. oxygen or air.

FIG. 1 illustrates a known starting sequence that is used to obtain a transferred arc for the purposes of plasma arc cutting. A pilot arc is first generated between the electrode (cathode) and the nozzle (anode) (step 10). Generation of the pilot arc may be by means of a high frequency, high voltage signal coupled to a DC power supply and the torch, or any of a variety of contact starting methods. Next, a gas flow passes through the nozzle exit orifice (step 12) causing the pilot arc to attach to the nozzle end face near the nozzle exit orifice.

Transfer height is defined as the maximum distance that can be maintained between the end of the torch and the workpiece to accomplish successful transfer of the arc from the nozzle to the workpiece. Transfer height generally is a function of the pilot current and the pilot arc relay opening threshold current level. For example, increasing the pilot current or lowering the relay opening threshold (i.e., the current that opens the relay) increases the transfer height. An increased transfer height generally improves the ease of operation of the torch.

When spaced from a workpiece a distance that exceeds the maximum transfer height, the torch remains in the pilot arc mode. However, once the torch is brought to within the maximum transfer height (step 14), ionized gas reduces the electrical resistance between the electrode and the workpiece forming a transferred arc between the electrode and the workpiece (step 16).

The torch sustains the two arcs (i.e., the pilot arc and transferred arc) due to current sharing between the nozzle and the workpiece. When current sharing exists, the power source output current equals the current level of the transferred arc plus the current level of the pilot arc. The current flow to the workpiece is sensed to determine when there is sufficient current flow to satisfy a predetermined threshold value capable of reliably sustaining a transferred arc (step 18). When this occurs, the nozzle is electrically disconnected from the starting circuit by opening a relay (step 20), extinguishing the pilot arc while maintaining the transferred arc between the electrode and the workpiece. Once the arc is transferred to the workpiece, the current to the torch is adjusted to a cutting current level (step 22). The torch is operated in this transferred plasma arc mode, characterized by the conductive flow of ionized gas from the electrode to the workpiece, for the cutting or marking of the workpiece.

In some applications, such as hand cutting and expanded metal cutting using a pilot arc controller, the torch can operate in pilot arc mode for a significant fraction of the power supply duty cycle. During these applications, pilot arc wear on the nozzle can become significant. This pilot arc wear reduces nozzle life and degrades the performance of the torch.

Experiments have shown that nozzle wear is a function of pilot current, i.e., nozzle wear increases with increasing pilot arc current. One method for improving arc transfer without increasing pilot arc current excessively involves decreasing the threshold current level of the pilot arc relay. However, the threshold level must be maintained at a high enough value to assure stable arc transfer. In presently available plasma arc torch systems, it has proven difficult to provide a pilot arc current level that is low enough to reduce nozzle wear, yet high enough to provide reliable transfer of the arc to the workpiece at a reasonable transfer height.

SUMMARY OF THE INVENTION

A principle discovery of the present invention is the use of two different thresholds to control pilot current, which has been found to reduce nozzle wear while maintaining a reliable pilot arc and an adequate transfer height. Applicants have recognized that by monitoring low levels of current in the lead that normally carries high current, it is possible to maintain the pilot arc at a low current level and determine more accurately when to adjust the level of output current to reliably sustain a transferred arc such that the pilot arc can be extinguished. Thus, maintaining low current level during pilot mode saves wear on the nozzle. Applicants have found the invention to be particularly advantageous when employed in a hand-held plasma arc torch system.

In one aspect, the present invention provides a circuit for use in starting a plasma arc torch system that includes a current source, a nozzle, and an electrode. The current source provides current at a first current level to generate a pilot arc between the electrode and the nozzle and, when the torch is disposed near the workpiece, a transferred arc between the electrode and a workpiece. The circuit comprises an inductive element electrically coupled to the current source and the workpiece for inducing a current proportional to a current level of the transferred arc. An electromagnetic sensor is coupled to the inductive element for sensing the induced current. A controller is electrically coupled to the electromagnetic sensor for (a) monitoring the induced current, (b) determining the current level of the transferred plasma arc from the induced current, and (c) increasing the output current level of the current source when the current level of the transferred arc reaches a first threshold. A switch is electrically coupled to the controller and the nozzle for disconnecting the nozzle from the current source to extinguish the pilot arc when the current level of the transferred arc reaches a second threshold.

In a detailed embodiment, the inductive element comprises a magnetic core. More specifically, the inductive element can comprise a gapped magnetic core and at least a portion of the electromagnetic sensor can be disposed in the gap. In another embodiment, the electromagnetic sensor is a Hall effect sensor. In another embodiment, the switch is a relay, solid state switch, or IGBT device. In yet another embodiment, at least one of the first and second thresholds is a function of the remanence effect of the inductive element.

In another aspect, the invention features a method for generating a transferred arc in a plasma arc torch system. A current source provides current at a first current level, and a pilot arc is generated between the electrode and the nozzle. When the torch is disposed in close proximity to the workpiece, the current level of the transferred plasma arc formed between the electrode and the workpiece is measured using an electromagnetic sensor and an inductive element. The current level of the current source is increased to a second current level when the current level of the transferred arc reaches a first threshold. The pilot arc is eliminated when the current level of the transferred arc reaches a second threshold.

In another embodiment, the analog voltage level is measured across the electromagnetic sensor and the analog voltage is converted to a digital control signal, which is used to control the pilot arc. In yet another embodiment, the current source is electrically coupled to the inductive element to generate electromagnetic flux in the inductive element, the inductive element is electrically coupled to the electromagnetic sensor, and an induced signal is measured in the electromagnetic sensor that is proportional to the level of current being drawn from the current source. In still another embodiment, the remanence effect of the inductive element is determined and at least one of the first and second thresholds is adjusted by a signal representative of the remanence effect.

In another aspect, the invention features a method for reducing the wear on a nozzle used in a plasma arc torch system that includes a current source and an electrode. An inductive element is electrically coupled to the current source and the workpiece, and an electromagnetic sensor is coupled to the inductive element. The remanence effect of the inductive element is determined by measuring the induced flux when the current source is off, and this value is used to compute an adjustment to at least one of a first and second threshold levels. A pilot arc is generated between the electrode and the nozzle, and a transferred arc is generated between the electrode and the workpiece when sufficiently close, and the total output current (i.e., the current to both arcs) is at the first level. A current is induced in the inductive element that is proportional to the current level of the transferred arc. An electromagnetic sensor senses the induced current, and the induced current level is used to determine the current level of the transferred plasma arc. When the current level of the transferred arc reaches the first threshold, the output current of the current source is increased to a second current level. When the current level of the transferred arc reaches the second threshold, the nozzle is disconnected from the current source to extinguish the pilot arc.

In still another aspect, the invention provides a method for reducing nozzle wear in a plasma arc torch system when the torch is moved away from a workpiece. A pilot arc is generated between the electrode and the nozzle when the current source is at a first current level. When the torch is disposed in close proximity to the workpiece, the current level of the transferred plasma arc formed between the electrode and the workpiece is measured using an electromagnetic sensor and an inductive element. The current level of the current source is increased to a second current level when the current level of the transferred arc reaches a first threshold. The pilot arc is eliminated when the current level of the transferred arc reaches a second threshold. During cutting, the arc voltage (e.g., an error amplifier voltage) is monitored to determine if the voltage exceeds the level at which the current source no longer can maintain the setpoint (e.g., cutting) level. If this occurs, the pilot arc relay is closed, then the current source is stepped down to provide an output current at a lower current level. In some embodiments, this lower current level is the same level as the lowest level of pilot arc current. The torch system continues to operate at the lower current level until the torch is moved close enough to the workpiece. Then the transfer sequence is repeated.

These and other features and objects of the invention will be more fully understood from the following detailed descriptions which should be read in light of the accompanying drawings.

BRIEF DESCRIPTION OF THE DRAWINGS

The foregoing and other objects, features, and advantages of the invention will become apparent from the following more particular description of preferred embodiments of the invention, as illustrated in the accompanying drawings. The drawings, including the timing diagrams, are not necessarily to scale, emphasis instead being placed on illustrating the principles of the present invention.

DETAILED DESCRIPTION OF THE INVENTION

Figure 1:
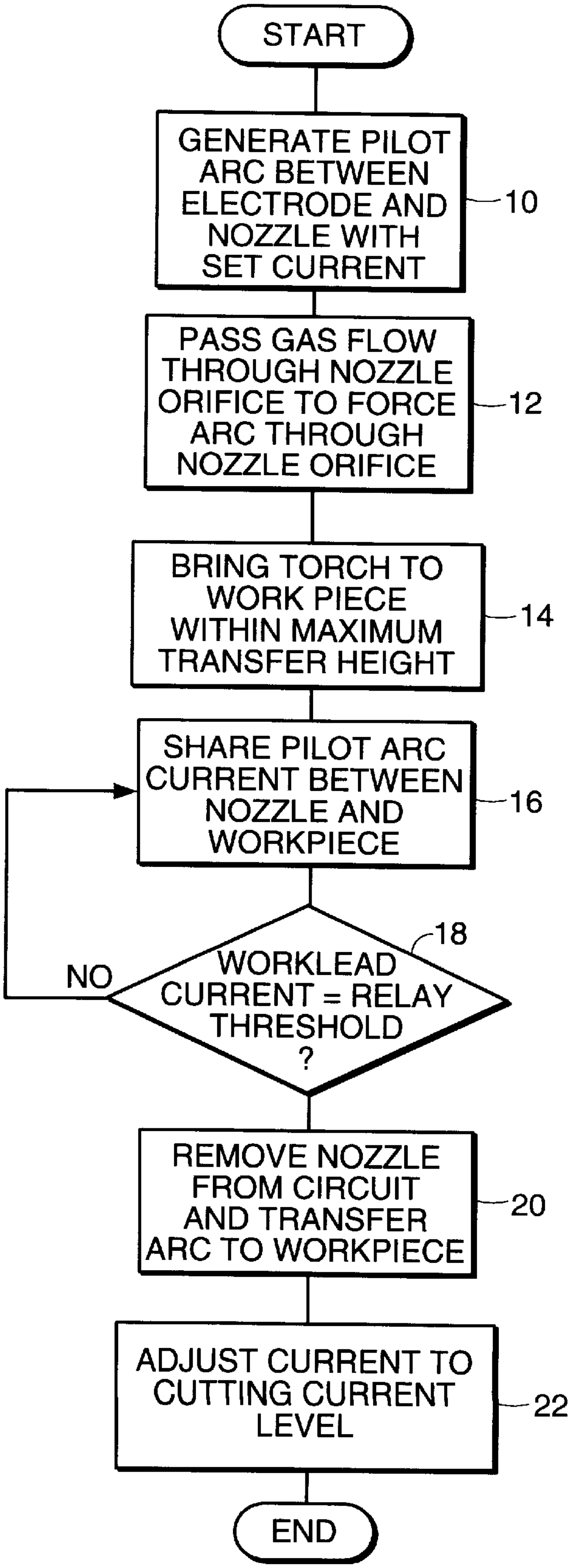
FIG. 1 PRIOR ART
FIG. 1 is a flow chart illustrating a known starting sequence for a plasma arc torch system.
Figure 2:
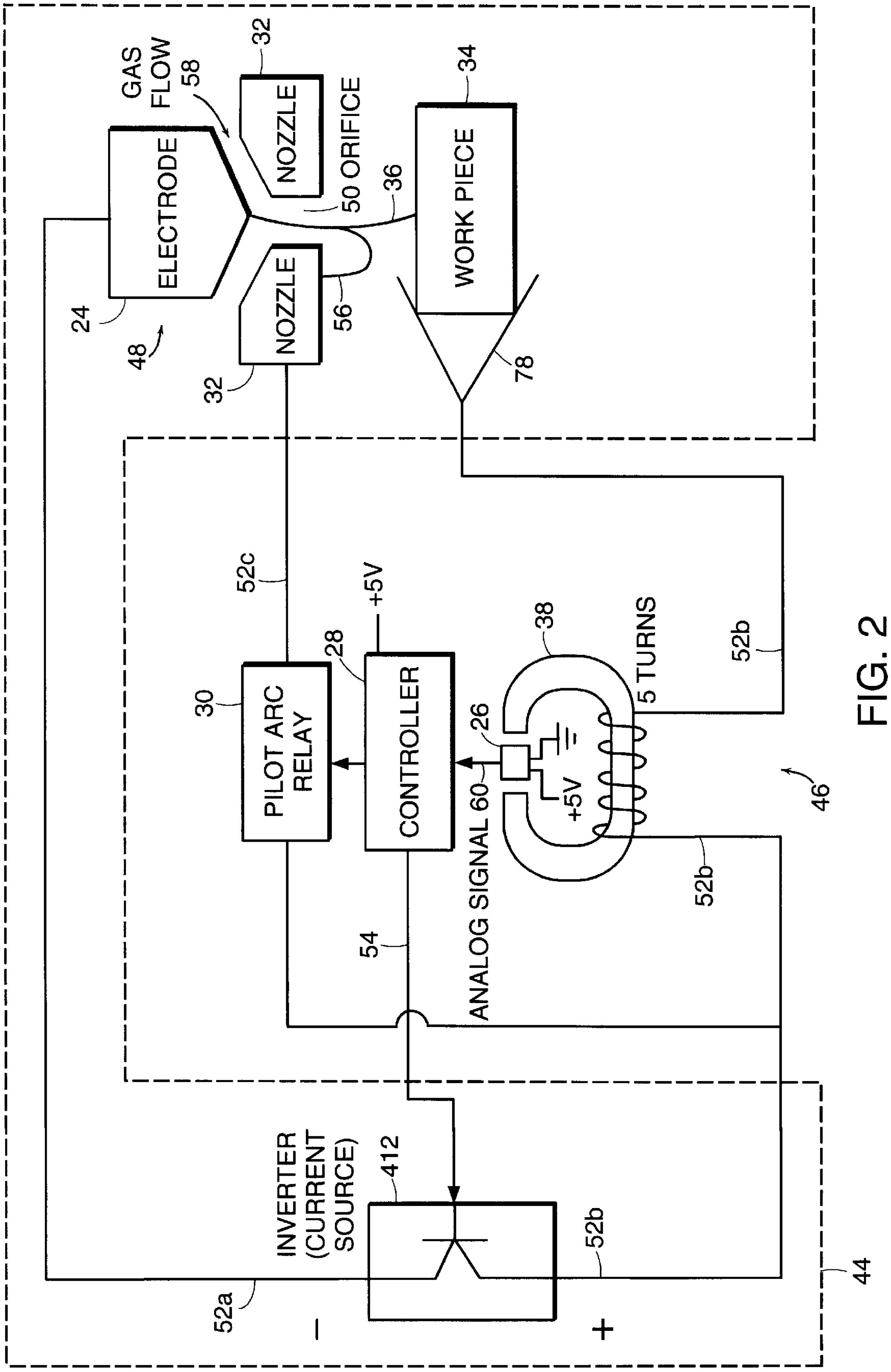
FIG. 2 is a simplified circuit diagram of a control circuit for a plasma arc torch system in accordance with an embodiment of the invention.

FIGS. 2–6 illustrate a plasma arc torch system, method of operation, and timing sequence according to the present invention. FIG. 2 shows a plasma arc torch system 44 incorporating a circuit 46 in accordance with the present invention. The torch 48 includes an electrode 24 mounted within a torch body (not shown). A nozzle 32 with a central exit orifice 50 is mounted relative to the electrode in the torch body. The exit orifice 50 provides a path between the nozzle 32 and the electrode 24 for a flow of working gas 58 to pass through towards the workpiece 34. The torch 48 also includes electrical connections, passages for cooling arc control fluids, a swirl ring to control the fluid flow patterns, and a power source, but these features are not necessary to describe the present invention and have been omitted from the drawings.

The electrode 24 is electrically connected to the nozzle 32 and the workpiece 34 via a power supply 42 and the control circuit 46. This connection enables a pilot arc 56 to be generated between the nozzle 32 and the electrode 24 and enables a transferred arc 36 to be generated between the electrode 24 and the workpiece 34. A flow of a plasma gas 58 through the torch 48 is ionized by the pilot arc 56 and/ or by the transferred arc 36.

In some embodiments, the plasma arc torch system 44 uses a high frequency high voltage (HFHV) signal, such as the spark discharge produced by a Marconi generator (not shown), to initiate a pilot arc 56 between an electrode 24 and a nozzle 32 of a plasma arc torch 48. In other embodiments, the torch 48 employs a contact starting process. In addition, other starting processes can be utilized without departing from the scope of the invention.

By means of example only, the power supply 42 is shown as an inverter. In one embodiment, the power supply 42 actually operates as a closed-loop, controlled current source. That is, the DC output voltage of the power supply 42 is continuously varied during operation of the torch 48 to maintain an output (arc) current at a selected value. By way of example and not limitation, the power supply 42 can produce a selected D.C. operating current of 20–50 amperes (A) at 0–200 volts for one plasma arc torch system sold by Hypertherm, Inc. However, one skilled in the art will recognize that other current and voltage ranges are usable.

A conventional electrical lead set 52 is coupled to power supply 42 and includes a negative lead 52*a* connected from the negative output terminal of the power supply 42 to the electrode 24 and a positive lead 52*c* connected to the nozzle 32 via switch 30 (which is shown by way of example only as a relay). The switch 30 can comprise a solid state switch (such as a transistor), IGBT device, and the like, as is well understood by those skilled in the art. The positive lead 52*b* carries the transferred current to be sensed and is wrapped around the inductive element 38.

In one embodiment, the inductive element 38 is a 0.050" gapped toroidal ferrite core wrapped with five turns of the positive lead 52*b*. However, one skilled in the art will appreciate that other types of inductive elements, including those made of different materials, magnetic materials, having different sizes and shapes, are usable within the scope of the invention. For example, in some embodiments, the inductive element 38 can comprise a gapped "E" type core. In other embodiments, the inductive element 38 can comprise another core material, including permanent magnets (e.g., SmCo and NeFeB). In addition, the number of turns can be varied based upon gap width, toroid material, or other circuit parameters.

An electromagnetic sensor 26 is disposed in the gap of the inductive element 38 for sensing the current induced in the inductive element. In one embodiment, the electromagnetic sensor 26 comprises a precision Hall Effect sensor, such as the MLX90215 Analog Hall Effect Sensor manufactured by Melexis Microelectronic Integrated Systems, Webster, Mass. The current flowing through the lead 52*b* induces the magnetic flux in the inductive element 38, and the Hall effect sensor 26 converts the induced magnetic flux to a voltage. Using this technique in combination with the offset compensation technique described below, even very small current levels can be sensed accurately in a lead that normally carries very high current. The following example illustrates detection of a low current level in the circuit of FIG. 2.

Current and magnetic field in a gapped core can be related by the equation:

$$\beta=(0.5(N)(I))/G \qquad [1]$$

where

β=magnetic flux (Gauss);

N=number of turns of conductor around the core;

I=current (Amperes); and

G=gap (inches), of the core.

With a gap of 0.050", and five turns, the formula becomes:

$$\beta=50(I). \qquad [1]$$

The voltage across a Hall effect sensor 26 is expressed as $$V_{out}=V_{offset}+\sigma\beta \qquad [2]$$

where $V_{offset}$=quiescent voltage (i.e., $V_{out}$ for β=0 Gauss, no magnetic field);

σ=sensitivity (mV/Gauss); and

β=magnetic flux (Gauss).

The Hall effect sensor used in FIG. 2 has a sensitivity of 14 mV/Gauss. Thus, substituting [1] into [2] yields:

$$V_{out}=V_{offset}+0.7(I). \qquad [3]$$

The voltage $V_{offset}$ generally is small and is caused by core remanence (i.e., the magnetic flux that remains in a magnetic circuit after an applied magnetomotive force has been removed). In one embodiment (described below), a method is provided for compensating for this remanence effect. For now, the remanence effect of the inductive element 38 is assumed to be negligible such that:

$$V_{out}\approx 0.7(I). \qquad [4]$$

Thus, in the circuit 46, a current of 0.4 A flowing in positive lead 52*b* (i.e., a current of 0.4 A flowing to the workpiece 34) produces an output voltage of about 0.28V across sensor 26. The signal that is indicative of the voltage across sensor 26 is provided to controller 28 as analog signal 60.

This calculation provides an example using specific components and is not intended to be limiting as to the operation of the present invention. Use of different types of electromagnetic sensors, different gap sizes, different core materials, and the like, would yield different current and voltage levels and is within the level of those skilled in the art. In addition, by choosing a programmable Hall effect sensor such as the MXL90215 for the electromagnetic sensor 26, offset and sensitivity can be adjusted based on temperature considerations.

Referring again to FIG. 2, the analog signal 60 is fed to controller 28 for signal processing. That is, controller 28 monitors the level of current provided to workpiece 34 by monitoring the voltage across the sensor 26. In one embodiment, the controller 28 comprises a control board that includes a microcontroller, such as the 68HC705P6A manufactured by Motorola Corporation, Schaumburg Ill. In addition, in other embodiments, the controller 28 can include other components, such as R-C filters to filter the analog signal 60, analog to digital (A/D) converters to convert signals such as the analog signal 60 to a digital signal, pulsewidth modulator (PWM) circuitry for controlling power supply 42, and other types of interface and control circuitry known to those skilled in the art. Controller 28 is electrically coupled to power supply 42 via electrical lead 54 providing a current level control signal for power supply 42. In addition, controller 28 is electrically coupled to switch 30 so that the controller 28 can open the switch to disconnect the nozzle from the current source and thereby extinguish the pilot arc.

The controller 28 determines when to command the power supply 42 to a different current level and when to open the relay based on two or more predetermined current threshold levels. A threshold level refers to a particular level of current that the sensor 26 senses in the lead 52*b*. The level of current may be indicative of certain conditions occurring in the plasma arc torch which are explained in greater detail below. For example, one threshold level may indicate a low level of current sharing between nozzle 32 and workpiece 34. Another threshold level may indicate that the current to the workpiece 24 is sufficient to sustain a transferred arc. Still another threshold level might indicate that the torch has been moved too far away from the workpiece for the power supply 42 to provide an output current at the necessary current and voltage levels. Those skilled in the art may recognize other threshold levels useful for the plasma arc torch system.

In one embodiment, the controller 28 can include a microcontroller that is pre-loaded with two or more threshold levels. As explained below, the level of any one or more of the two or more thresholds may be adjusted by the offset voltage of the sensor 26. It is not required in the present invention to adjust any of the thresholds by the offset voltage of the sensor 26. In one embodiment, either or both of the threshold levels could be selected to minimize the amount of time that the nozzle 32 is exposed to a high level of current while still maintaining adequate transfer height and providing a stable pilot arc 56.

Figure 3:
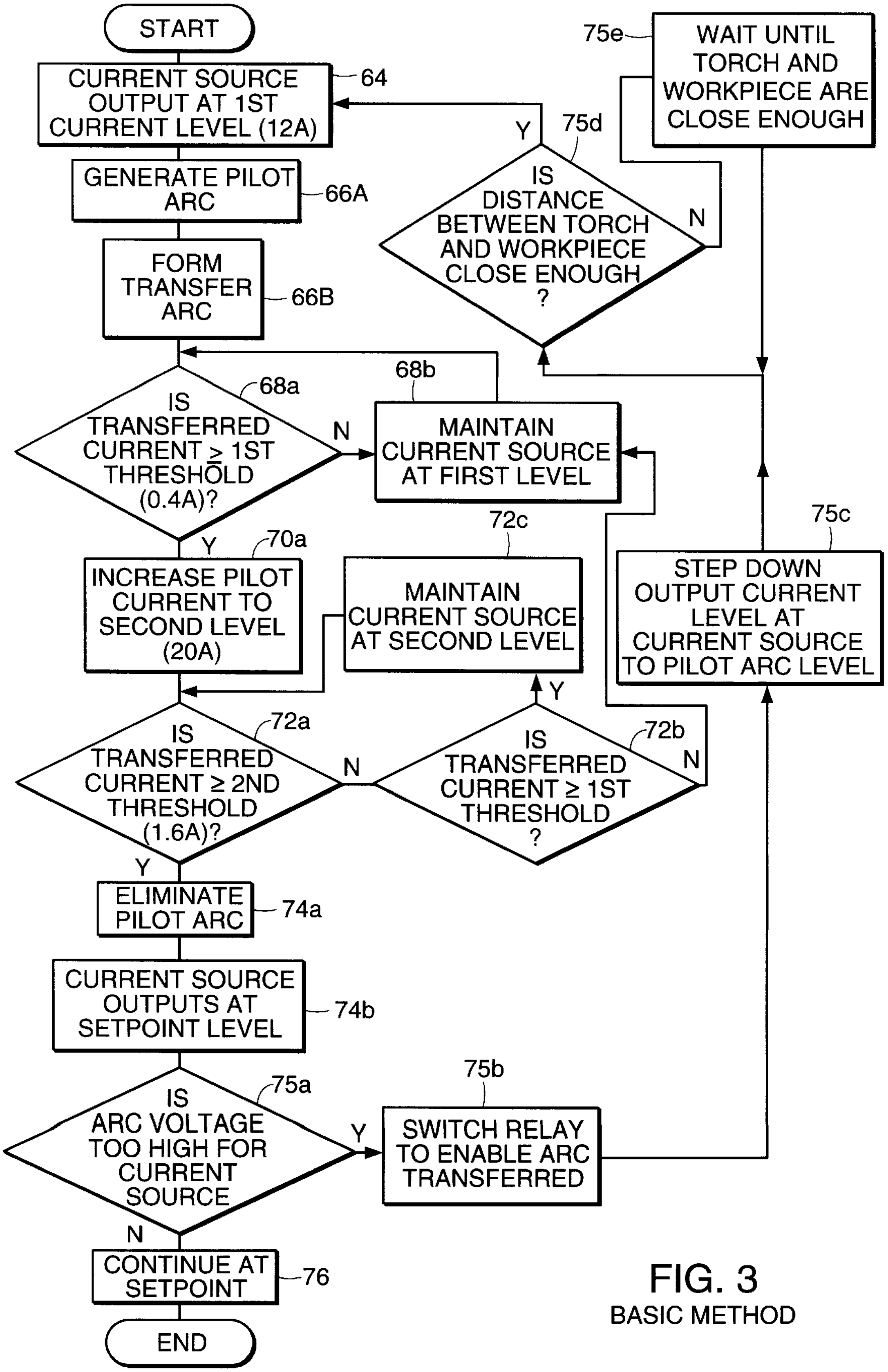
FIG. 3 is a flow chart describing a starting sequence for a plasma arc torch system in accordance with another embodiment of the invention.

Referring now to FIG. 3, when the plasma arc torch system is started, the controller commands the current source to provide current at a first output current level (e.g., 12 Amps) (step 64), which generally is chosen to be just high enough to reliably provide a stable pilot arc (step 66*a*) and the formation of the transfer arc (step 66*b*). The controller continues to command the current source to provide current at the first current level until the current level at workpiece reaches a first threshold level (e.g., 0.4 Amps) (step 68*a*). By monitoring the output of the Hall effect sensor, the controller can accurately determine when the threshold is reached. The first controller threshold corresponds to a point at which a low level of current sharing begins between the nozzle 32 and the workpiece 34 (see FIG. 2). If the threshold is not yet reached, the controller continues to command the power supply to output current at a first output level (step 68*b*). Upon reaching the first threshold, the controller then commands the current source to increase the output current to a second current level (e.g., 20 A) (step 70*a*). The controller continues to command the current source to provide current at the second current level until the current level at the workpiece 34 reaches a second threshold level (e.g., 1.6 A) (step 72*a*). At this point, the transferred current has reached a current level capable of reliably sustaining a transferred arc to the workpiece, so the pilot arc no longer is needed. Accordingly, the controller opens the relay to eliminate the pilot arc (step 74*a*). Because the nozzle is removed from the circuit formed between the current source, the electrode, and the workpiece, all current is transferred to the workpiece. Thus, the current source can output current at the setpoint level (the level sufficient to perform cutting) (step 74*b*).

In some embodiments of the invention, when the power supply is outputting current at the second level (e.g., 20 Amps) (step 70*a*) and the transferred current has not yet reached the second threshold (step 72), the controller can determine whether the transferred current to the workpiece is still at or above the first threshold (step 72*b*). If the transferred current is still above the first threshold level, then the power supply continues to output current at the second level (step 72*c*). If, however, the transferred current level is not above the first threshold level, then the controller commands the power supply to output current at a first current level (e.g., 12 Amps) (step 68*b*) until the transferred current level reaches the first threshold level (step 68*a*).

In another embodiment of the invention, when the power supply is outputting current at the setpoint level (e.g., 20 Amps or more) (step 74*b*) the controller monitors the arc voltage to determine if the power supply can continue to maintain the transferred arc at the necessary current level. As is described below, in some embodiments, an error amplifier circuit can be used to monitor the arc voltage and determine whether the power supply can continue supplying current at the commanded level. If the controller determines that the arc voltage is too high (step 75*a*) the pilot arc relay is switched to enable the formation of a pilot arc (step 75*b*), and the controller steps down the current (step 75*c*) to a pilot arc level.

Figure 4A:
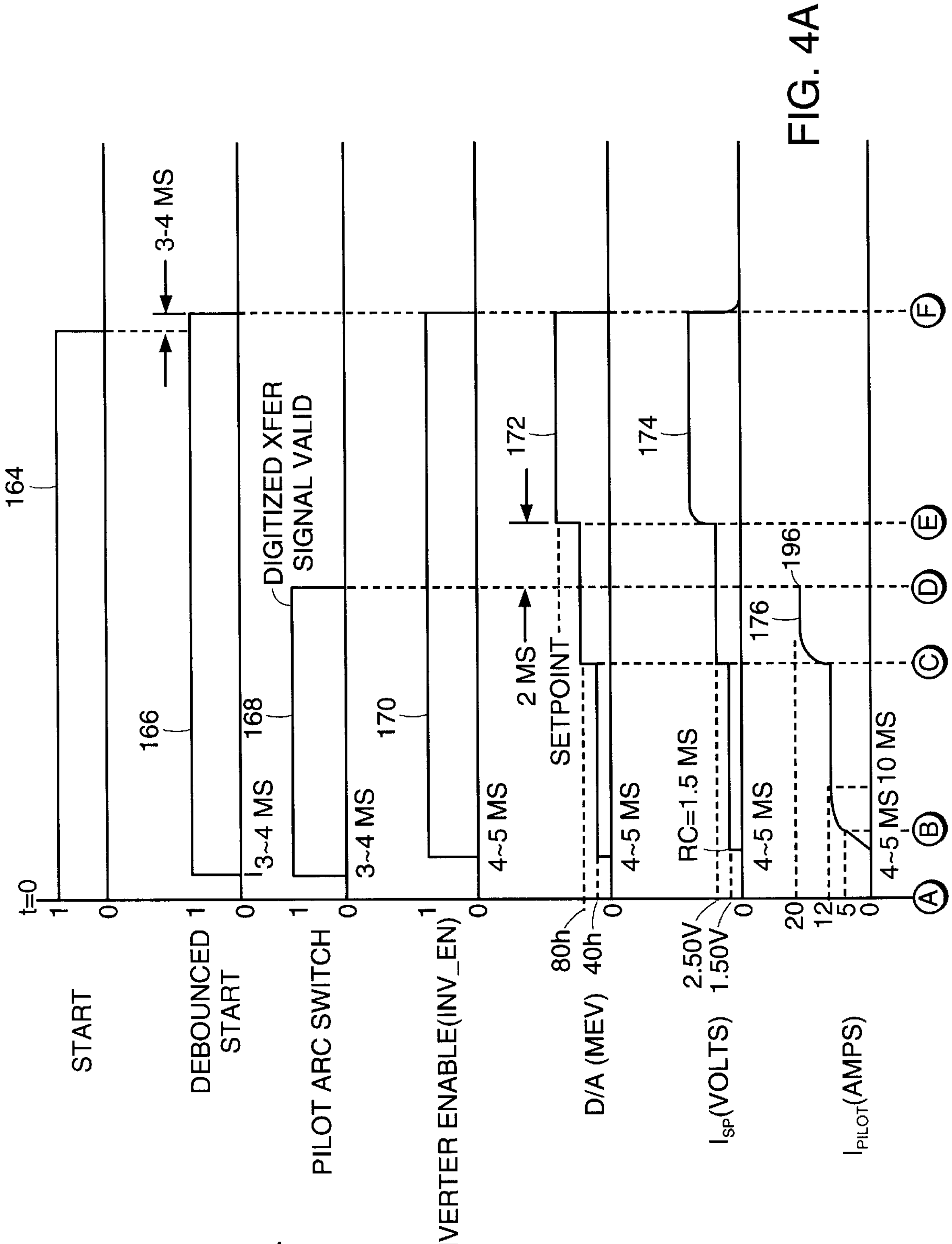
FIG. 4 is a timing diagram according to the present invention for the circuit shown in FIG. 2 illustrating the state of system parameters during torch start-up as a function of time.
Figure 4:
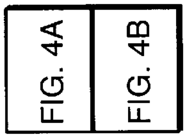
Figure 4B:
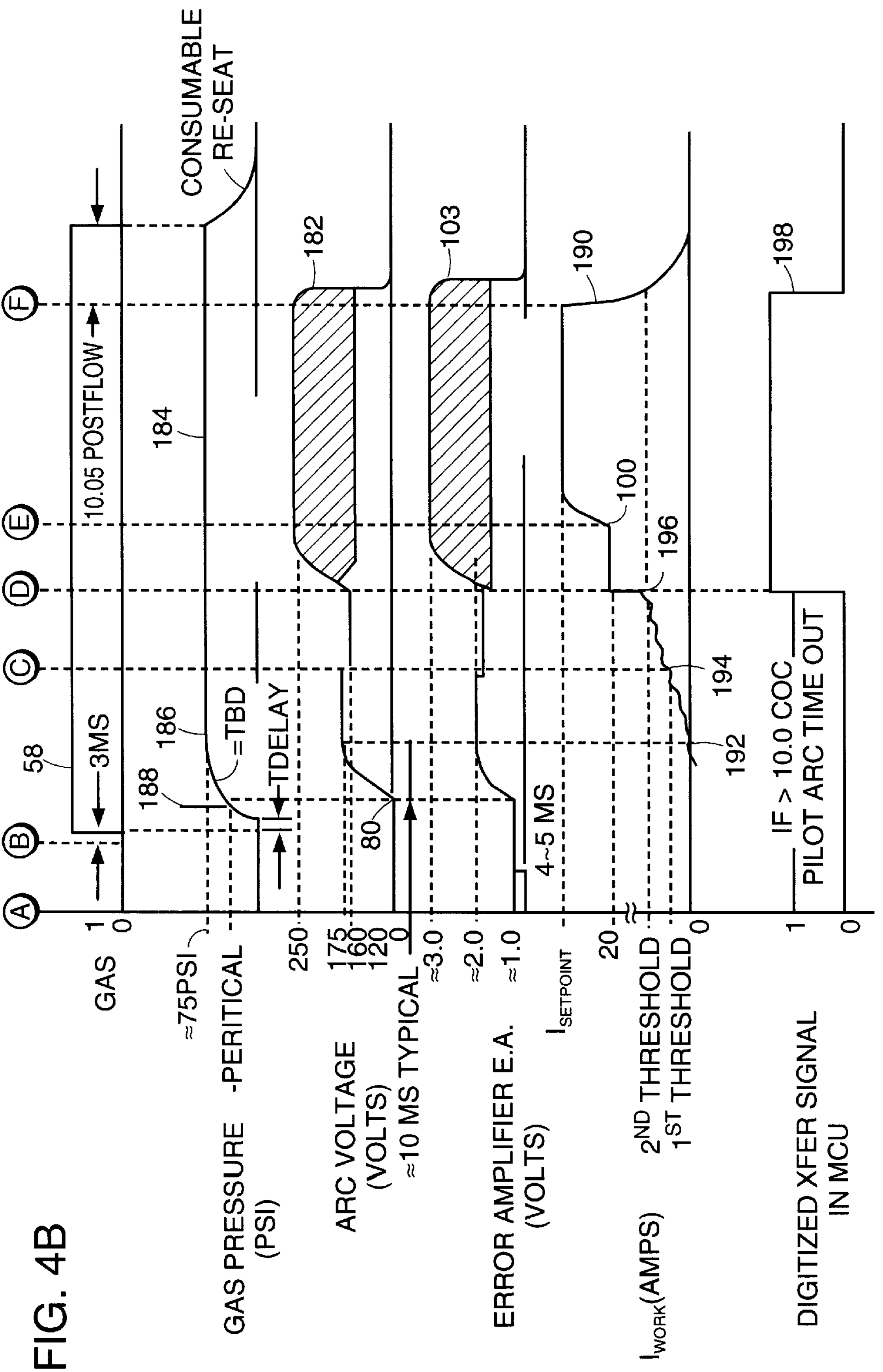

FIG. 4 is a timing diagram for the circuit 46 and torch 44 of FIG. 3 showing the state of system parameters during torch start-up as a function of time. At start-up, the workpiece 34 is electrically connected to the torch system, typically via a clamp 78. In addition, although the torch 48 itself generally is not enabled prior to initiating the start signal 64, the controller 28 is already receiving power from an external power source (not shown in FIG. 2). A start signal 164 comes from a start up circuit (not shown in FIG. 2) and initiates torch start-up process as a function of time. Typically, start signal 164 is initiated when a user presses a start or on switch in a torch system. Some embodiments of the invention also include circuitry to compensate for switch bounce; the output of such circuitry results in the debounced start signal 166, which typically is delayed from the actual start signal by 3 to 4 ms. Upon receiving the debounced start signal 166, the controller 28 generates a pilot arc switch signal 168 to close the switch 30, connecting the nozzle 32 to the power supply 42.

The controller 28 then transmits control signals to turn on the power supply 42 and control the output current level. The controller 28 sends an enable signal 170 to turn on the power supply 42 and a D/A control signal 172 to cause the power supply 42 to supply output current at a particular current level. In the illustrated embodiment, the D/A control curve 172 is a hexadecimal control signal defining $I_{sp}$, the set point voltage level 74, which in turn corresponds to $I_{pilot}$, the pilot current level 176 that the power supply 42 is commanded to reach. For example, the point on the D/A curve 172 corresponding to 40 (hexidecimal), in one embodiment, corresponds to a set point voltage level 174 of 1.50V, to command the power supply 42 to reach a pilot current level 176 of 12 A.

When the level of the pilot arc current 176 reaches a predetermined level (illustrated in the embodiment of FIG. 4 to be approximately 5 Amps.) a plasma gas flow 58 is initiated. The plasma gas flows between the electrode and the nozzle, and when the gas pressure 184 reaches a critical pressure level 188, the pilot arc is formed between the electrode and the nozzle. The formation of the pilot arc 56 is shown at about point 80 (starting point) on the arc voltage curve 182, a point that also corresponds to critical pressure level 188 on the gas pressure 184. The arc voltage 182 continues to ramp up until the gas pressure 184 of the gas flow 58 reaches a pressure of approximately 75 pounds per square inch (psi).

The formation of a pilot arc 56 creates a closed circuit path from the negative terminal of the power supply 42 to the electrode 24, through the pilot arc 56, to the nozzle 32, through the pilot arc switch 30, and back to the positive terminal of power supply 42. Initially, the low level of pilot arc current (e.g., 12 Amps) flows through this path, thereby minimizing the wear on the nozzle. As this occurs, the torch 48 gradually is being brought into close proximity with the workpiece 34. When the torch 48 is brought to within the maximum transfer height, a low level of current sharing begins between the electrode pilot arc 36 and the transferred arc 56. This is illustrated on the workpiece current curve 190 (i.e., $I_{work}$, the current being shared with the workpiece 34) at point 192. At this time, the transferred arc 36 is formed between the electrode 24 and the workpiece 34.

Concurrently, the controller 28 uses the inductive element 38 and the sensor 26 to continually monitor the level of current being shared in the workpiece 34, as described previously. In one embodiment, the controller 28 monitors the output voltage of the sensor 26 and converts it to a digital hex value twice during every loop of the software that runs on the controller 28. As described previously, the controller 28 can derive the level of workpiece current 90 from the voltage level across sensor 26. When the controller 28 determines that the workpiece current 190 has reached a first threshold level 194 (for example, 0.4 Amps), the controller 28 commands the power supply 42 to increase its output current 176 to a higher level. In the illustrated embodiment, when the first threshold is reached at point 194, the D/A signal 172 changes from 40 h to 80 h, thereby commanding the power supply 42 to change the level of the pilot current 180 from a first level (i.e., 12 Amps) to a second level (i.e., 20 Amps). However, it should be understood that the first and second threshold levels, the type and value of the control signals, and the pilot current levels are illustrated in FIG. 4 and described herein solely by way of example. Other values of control signal, pilot currents, and threshold levels are, of course, applicable and considered to be within the scope of the invention.

As current sharing between the nozzle 32 and the workpiece 34 continues, the workpiece current level 190 increases. The second threshold 196 represents, in this embodiment, the current level that is capable of reliably sustaining the transferred arc 36. In one embodiment, the second threshold level corresponds to approximately 1.6 Amps of workpiece current 190. When the workpiece current 190 reaches the second threshold 196, the controller 28 opens the switch 30 to disconnect the current path through the nozzle 32, thereby turning off the pilot arc.

As shown in FIG. 4, at the second threshold 196, the pilot arc switch 168 turns off the pilot current signal 176. Accordingly, the current from power supply 42 flows only along the path from the negative terminal of the power supply 42, to the electrode 24, through the transfer arc 36, to the workpiece 34, and to the positive terminal of the power supply 42 (via the inductive element 38 and sensor 26). In addition, as shown in FIG. 4, at point 196 the digitized transfer signal 198 becomes valid. When the digitized transfer signal 198 is valid it indicates that current is being fully transferred to the workpiece 34. Some time afterwards (e.g., about 2 ms) the transfer signal 198 becomes valid, at point 100 of FIG. 4, and the controller 28 transmits a D/A signal 172 at a "SETPOINT" level so that the workpiece current 190 will reach $I_{setpoint}$. The $I_{setpoint}$ workpiece current level 190 corresponds to the cutting current level.

As was discussed previously, the actual voltage level across the sensor 26 in some embodiments can be adjusted for by an offset ($V_{offset}$) that is a function of the remanence effect of the inductive element. In one embodiment of the present invention, a method is provided to compensate for this remanence. In this embodiment, the levels of the first and second thresholds are adjusted by the offset, so that the controller 28 can accurately determine the level of current to the workpiece 34. Although the method described herein refers to adjusting both the first and second threshold levels for the remanence effect of the inductive element 38, it is not necessary to adjust either level. For example, in one embodiment of the invention, neither threshold level is adjusted for the remanence effect. In other embodiments of the invention, the controller adjusts just one of the thresholds for the remanence effect.

Figure 5:
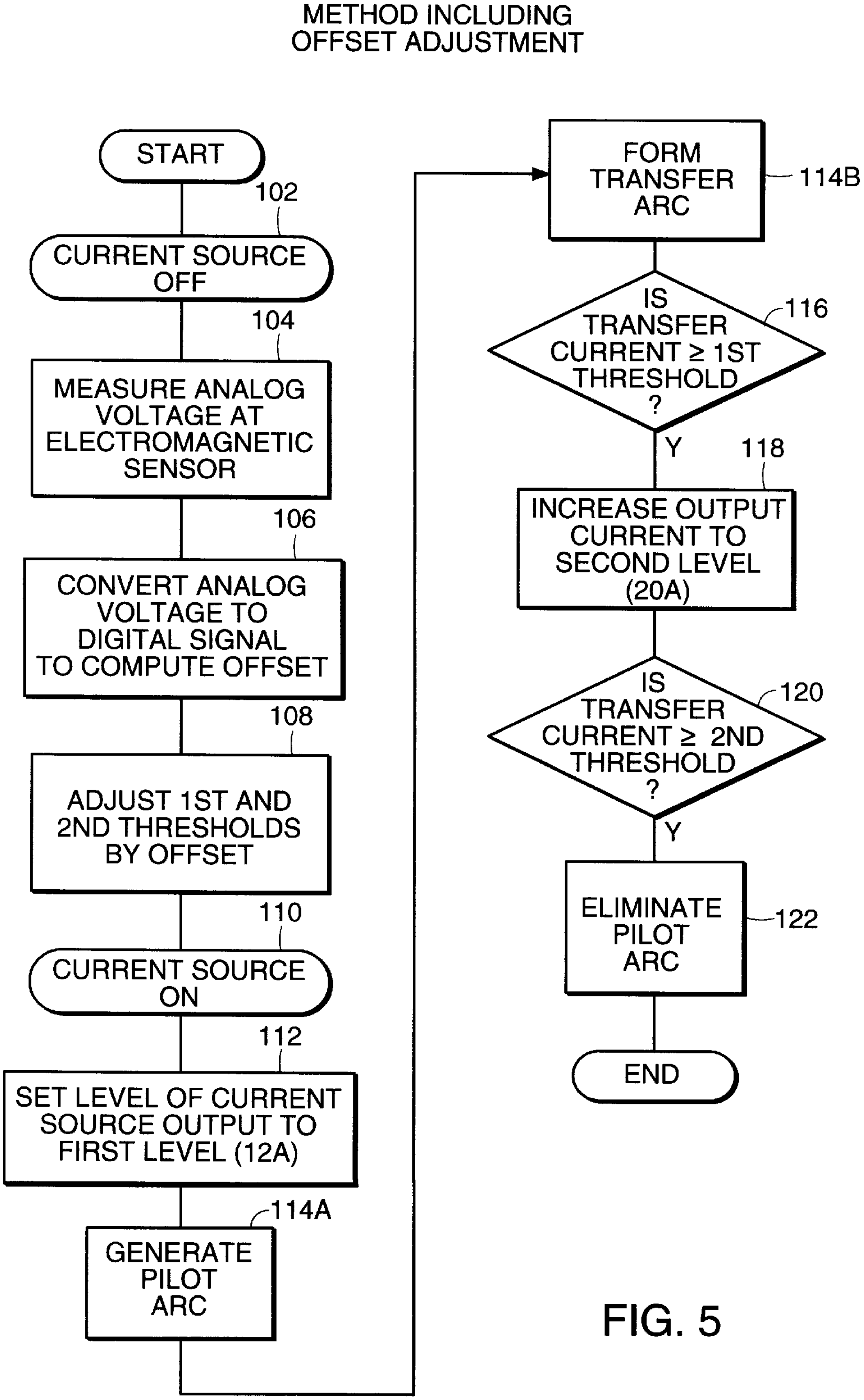
FIG. 5 is a flow chart illustrating a starting sequence for a plasma arc in accordance with still another embodiment of the invention.

FIG. 5 illustrates the method for adjusting the first and second thresholds of the system of FIG. 2 by the measured remanence of inductive element 38, and using this offset during generation of the plasma arc. In this method, the offset value is determined by sampling the output of sensor 26 while the power supply 42 is off. The remanence of inductive element 38 can vary from unit to unit (i.e., different cores made of the same material can have different remanence effects), and also can vary over time and temperature. By tracking the offset when the power supply 42 is off, the controller 28 can automatically calibrate the sensor 26, to make the measurement of low-level currents in the system more accurate.

When the power supply is off (step 102), the controller measures the analog voltage level at the sensor (step 104). As described previously, this level corresponds to the residual magnetic flux in the inductive element 38. This current level is converted to a digital signal (step 106) to compute an offset that can be added to the predetermined first and second threshold levels (step 108). For example, if the offset voltage is determined to be 50 mV, the voltage measured across sensor 26 of FIG. 2 would need to be adjusted by 50 mV on every measurement. As an equivalent alternative, the method of FIG. 5 instead adjusts the threshold level to which the sensor voltage is compared. Thus, when the power supply 42 is turned on (step 110), the subsequent current level measurements that the controller 28 makes will be compared to the threshold levels established when the power supply 42 was off. Description of the remaining steps 112–122 of FIG. 5 is omitted because these steps are equivalent to steps 64–74, respectively, of FIG. 3.

In some embodiments, the method of FIG. 5 can comprise additional steps (not shown) that average the offset value to provide increased immunity to noise. Although not illustrated in FIG. 5, the substance of these steps is well within the understanding of one skilled in the art, and should be relatively straightforward to incorporate into the method of FIG. 5. Specifically, after the offset is computed (step 106), the offset can be stored (step 106A, not shown), so that when the power supply is turned on and the system is started (step 110), the controller can first compute an average offset from a plurality of the previously calculated and stored offsets (step 110A, not shown). For example, upon turning the power supply on (step 110), the 16 most recently measured and stored (step 106A, not shown) offsets can be averaged (step 110A, not shown) and provided as the offset by which either or both of the first and second threshold values may be adjusted (step 108).

In still another aspect, the plasma arc torch system of the present invention also can be used to reduce nozzle wear not only prior to cutting, but also during cutting, particularly when cutting a discontinuous (or grated) workpiece. During cutting, the distance between the torch and the workpiece (i.e., standoff distance) can become too large to maintain the arc. This can also occur when the torch is moved from one workpiece to another or when the torch is disposed over open space—generally any discontinuity in workpiece material. The standoff distance differs from maximum transfer height in that the former refers generally to the distance between the torch and the workpiece, whereas the latter refers specifically to the maximum distance that can be maintained between the end of the torch and the workpiece to accomplish successful transfer of the arc from the nozzle to the workpiece. When standoff distance becomes too large, the transferred arc extinguishes and the torch returns to the low level of power supply output current. Operation at the lower current level (i.e., the pilot current level) can improve the useful life of the nozzle.

By using the control circuit of the present invention in combination with the circuit described in commonly assigned U.S. Pat. No. 5,520,617 (hereinafter "'617 patent"), nozzle wear during cutting can be further reduced. In the '617 patent, the circuit includes an error amplifier to compare sensed current to operating current and for adjusting the power supply voltage to maintain an operating current in coordination with a change in the distance between the workpiece and the plasma arc torch tip. If the '617 patent circuit determines that the power supply has reached its limit of available output voltage for a selected operating current and standoff distance, the current is switched from the workpiece to the nozzle to form a pilot arc.

Because the circuit of the present invention can be used to minimize the time that a plasma arc torch system operates at the pilot arc current level (by utilizing two thresholds to determine when to increase power supply output current level), adding the control circuit of the present invention to the circuit of the '617 patent can further reduce nozzle wear when the system of the '617 patent runs at the lower pilot arc current level.

Effectively, embodiments of the present invention that feature a circuit incorporating both the circuit of FIG. 2 and that of the '617 patent can switch between transferred arc and pilot arc current levels while plasma arc torch continues to operate, thereby minimizing the damage to torch consumables. In one example of such an embodiment, FIG. 4 shows the error amplifier curve 103 during the generation of a pilot arc signal and FIG. 6 illustrates the error amplifier curve 103 (along with other curves) during cutting of a workpiece, ramping down of power supply output current, and re-establishment of cutting current levels.

Figure 6:
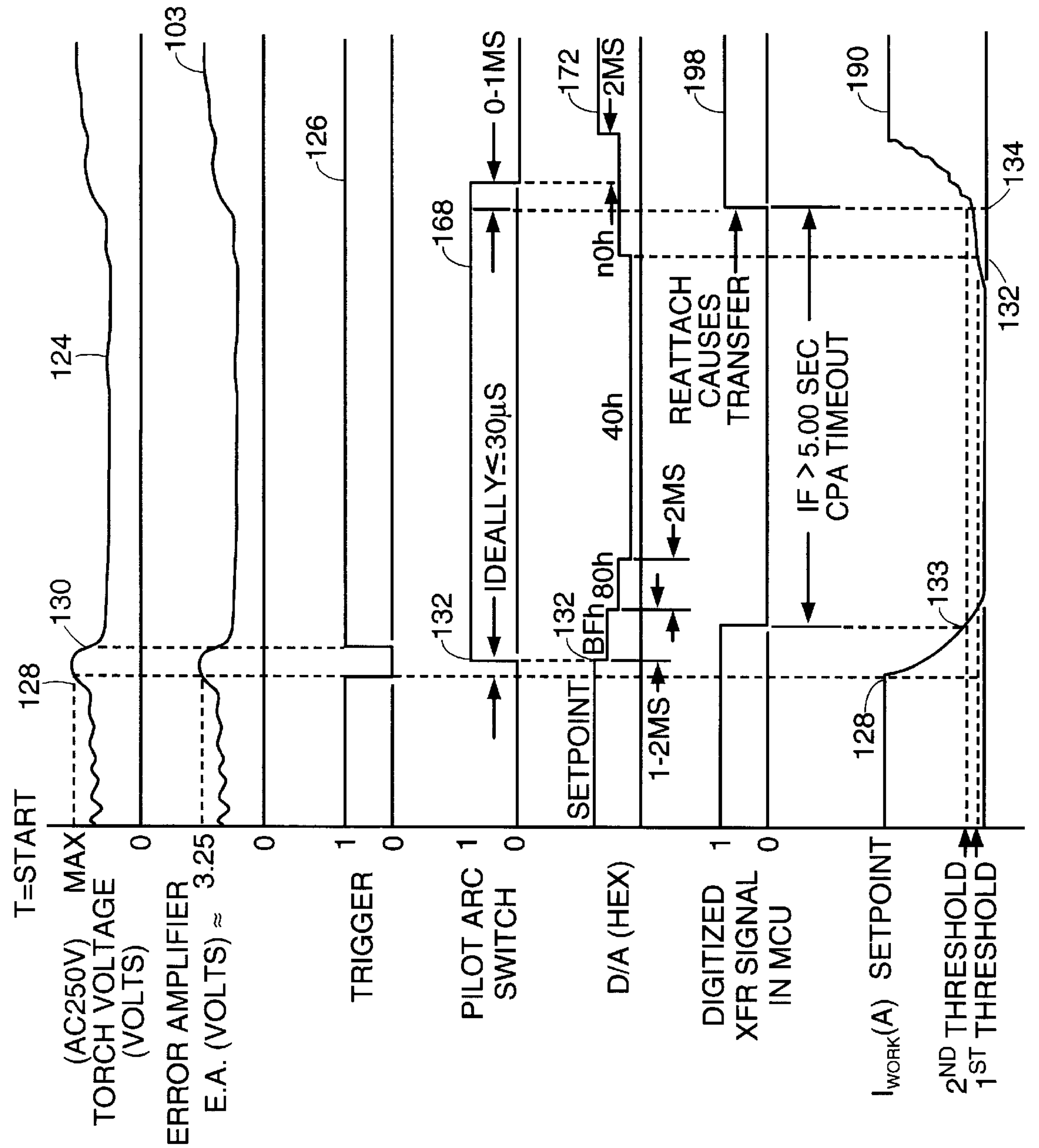
FIG. 6 is a timing diagram according to the present invention for the circuit shown in FIG. 2 in combination with a circuit that compensates for discontinuities in the workpiece, in accordance with yet another embodiment of the invention.

Referring to FIG. 6, during workpiece cutting, the error amplifier signal 103 plays an important role in embodiments of the invention that include the '617 system combined with the control circuit 46. Up until point 128 of FIG. 6, the workpiece current signal 190 is at the "SETPOINT" level. Between point 128 and point 133 of FIG. 6, the workpiece current signal 190 is above the second threshold, indicating that the plasma arc torch system is cutting. However, in FIG. 6, the standoff distance is increasing between the start time and point 133. As described in the '617 patent, when the standoff distance increases, the error amplifier signal 103 increases. This causes the torch voltage 124 (that is, the output voltage of power supply 42) to increase to maintain the workpiece current 190 as the plasma arc is "stretched."

When the error amplifier signal 103 reaches the maximum torch voltage level at point 128 of FIG. 6, a trigger control signal 126 is generated to reduce the workpiece current 190 to a pilot arc level. In one embodiment, the trigger control signal 126 corresponds to the output of a flip-flop. When the trigger control signal 126 is valid (at about point 132 on FIG. 6), the D/A signal 172 changes to command the power supply 42 to output at a pilot arc current level. The controller 28 generates a pilot arc switch signal 168 to transmit to the pilot arc switch 30 for closing the switch 30, re-connecting the nozzle 32 to the power supply 42.

In one embodiment of this aspect of the invention, the D/A signal 172 steps down the power supply output current level. As illustrated in FIG. 6, when the trigger control signal 126 is valid at about point 132, the D/A signal 172 first commands the power supply to change its output current to a level corresponding to BFh (which, by way of example, can correspond to about 30 Amps). Shortly thereafter, the D/A signal 172 commands the power supply to change its output current to a level corresponding to 80 h (which, by way of example, can correspond to about 20 Amps). The D/A signal 172 then commands the power supply to change its output current to a level corresponding to 40 h (the pilot arc level of current). One advantage of stepping down the commanded current in this manner is that it helps to avoid an undershoot of current that might occur if the commanded current level were dropped too sharply (e.g., from the "SETPOINT" level directly to 40 h). One consequence of current undershoot is that the pilot arc might extinguish completely if the commanded current is dropped too quickly.

Depending on the "SETPOINT" level of the workpiece current 190, the D/A signal in some instances might command a step down level that, initially, is greater than the "SETPOINT" level. This is not problematic; rather, it helps to avoid the current undershoot problem described above. As illustrated in FIG. 6, point 133 illustrates the point at which the workpiece current 190 is no longer able to be reliably sustained independent of the pilot arc. Thus, the D/A signal 172 continues to command the power supply 42 to output at a pilot current level. The system continues to operate at a pilot arc current level until the sensor 26 detects sufficient current in the workpiece 34 (indicative that the torch is becoming sufficiently close to the workpiece) to increase the current level. The operation of the system is otherwise generally similar to the operation described in connection with FIG. 4, with points 132 and 134, respectively, of FIG. 6 corresponding to the first threshold 194 and second threshold 196, respectively, of FIG. 4.

Equivalents

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A control circuit for use in starting a plasma arc torch system which includes a current source, a torch comprising a nozzle and an electrode, the plasma arc torch system generating an output current at a first current level for sustaining a pilot arc between the electrode and the nozzle and, when the torch is sufficiently close to a workpiece, a transferred arc between the electrode and the workpiece, the control circuit comprising:

an inductive element electrically coupled to the current source and the workpiece for inducing a current proportional to a current level of the transferred arc;

an electromagnetic sensor coupled to the inductive element for sensing the induced current;

a controller electrically coupled to the electromagnetic sensor for (a) monitoring the induced current, (b) determining the current level of the transferred arc from the induced current, and (c) increasing the current level of the pilot arc when the current level of the transferred arc reaches a first threshold; and a switch electrically coupled to the controller and the nozzle for disconnecting the nozzle from the current source to extinguish the pilot arc when the current level of the transferred arc reaches a second threshold.

2. The control circuit of claim 1 wherein the inductive element comprises a magnetic core.

3. The control circuit of claim 2 wherein the magnetic core has a gap in which at least a portion of the electromagnetic sensor is disposed.

4. The control circuit of claim 1 wherein the electromagnetic sensor is a Hall effect sensor.

5. The control circuit of claim 1 wherein the switch is a relay, a solid-state switch, or an IGBT device.

6. The control circuit of claim 1 wherein at least one of the first and second thresholds is at least partially a function of a remanence effect of the inductive element.

7. The control circuit of claim 1 wherein the controller determines a remanence effect of the inductive element by measuring the induced current when the current source is off and uses the remanence effect to adjust the value of at least one of the first and second thresholds.

8. A method for generating a transferred plasma arc in a plasma arc torch system which includes a current source, a torch including a nozzle and an electrode, comprising the steps of:

(a) generating at the current source an output current at a first current level;

(b) using the output current to generate a pilot arc between the electrode and the nozzle and a transferred arc when the torch is sufficiently close to a workpiece;

(c) measuring a current level of the transferred arc formed between the electrode and the workpiece using an electromagnetic sensor and an inductive element;

(d) increasing the output current to a second level when the current level of the transferred arc reaches a first threshold; and (e) eliminating the pilot arc when the current level of the transferred arc reaches a second threshold.

9. The method of claim 8 wherein the step of measuring the current level further comprises:

(i) measuring an analog voltage across the electromagnetic sensor;

(ii) converting the analog voltage to a digital control signal; and (iii) controlling the pilot arc using the digital control signal.

10. The method of claim 8 further comprising the steps of:

(f) determining a remanence effect of the inductive element; and (g) adjusting at least one of the first and second thresholds by a signal representative of the remanence effect.

11. The method of claim 10 wherein the step of determining the remanence effect of the inductive element further comprises measuring an induced current in the inductive element when the current source is off.

12. The method of claim 8 further comprising the steps of:

(f) periodically measuring the remanence effect of the inductive element while the current source is off;

(g) computing a signal representative of the average remanence effect from at least a portion of the remanence measurements; and (h) adjusting at least one of the first and second threshold values by a signal representative of the average remanence effect.

13. The method of claim 8 wherein the step of measuring the current level of the transferred arc comprises:

i) electrically coupling the current source to the inductive element to generate an electromagnetic flux in the inductive element; and ii) measuring an induced signal in the electromagnetic sensor that is proportional to the current level of the transferred arc.

14. A method for reducing the wear of a nozzle used in a plasma arc torch system which includes a current source and an electrode, comprising the steps of:

providing an inductive element electrically coupled to the current source and a workpiece and an electromagnetic sensor coupled to the inductive element;

determining a remanence effect of the inductive element by measuring an induced current when the current source is off;

generating an output current at a first level;

using the output current at the first level to generate a pilot arc between the electrode and the nozzle and a transferred arc between the electrode and the workpiece, when the torch is sufficiently close to the workpiece;

inducing a current, using an inductive element, proportional to the current level of the transferred arc;

sensing the induced current with an electromagnetic sensor;

determining the current level of the transferred arc from the induced current;

increasing the level of the output current at the current source to a second current level when the current level of the transferred arc reaches a first threshold, the first threshold being adjusted by a signal representative of the remanence effect of the inductive element; and disconnecting the nozzle from the current source to extinguish the pilot arc when the current level of the transferred arc reaches a second threshold.

15. A plasma arc torch system for use with a workpiece, comprising:

a plasma torch comprising an electrode and a nozzle;

a power supply electrically coupled to the electrode, the nozzle, and the workpiece;

a pilot arc generator for generating a pilot arc between the electrode and the nozzle;

an inductive element electrically coupled to the power supply and the workpiece for inducing a current proportional to a current level of the transferred arc that forms when the nozzle is in proximity to the workpiece;

an electromagnetic sensor coupled to the inductive element for sensing the induced current;

a controller electrically coupled to the electromagnetic sensor for (a) monitoring the induced current, (b) determining the current level of the transferred arc from the induced current, and (c) increasing the current level of the pilot arc when the current level of the transferred arc reaches a first threshold; and a switch electrically coupled to the controller, the nozzle, and the power supply, for disconnecting the nozzle from the power supply to extinguish the pilot arc when the current level of the transferred arc reaches a second threshold.

* * * * *

UNITED STATES PATENT AND TRADEMARK OFFICE

CERTIFICATE OF CORRECTION

PATENT NO. :6,133,543
DATED :October 17, 2000
INVENTOR(S) :Borowy, et al.

It is certified that error appears in the above-identified patent and that said Letters Patent is hereby corrected as shown below:

On the title page, item [56], insert the following:

U.S. PATENT DOCUMENTS

| | | | |
|---|---|---|---|
| 5,847,354 | 12/1998 | Daniel | 219/121.54 |

FOREIGN PATENT DOCUMENTS

| | | |
|---|---|---|
| 2 228 337 A | 8/1990 | United Kingdom . |
| WO91/18488 | 11/1991 | PCT . |
| 10263828 | 10/1998 | Japan (abstracts) . |

Signed and Sealed this

Twelfth Day of December, 2000

Attest:

Q. TODD DICKINSON

*Attesting Officer*

*Director of Patents and Trademarks*